United States Patent [19]

Bolante et al.

[11] Patent Number: 4,490,576

[45] Date of Patent: Dec. 25, 1984

[54] CONNECTOR FOR USE WITH JACKETED METAL CLAD CABLE

[75] Inventors: Jay J. Bolante, Chicago; Herbert W. Penzel, Lincolnwood, both of Ill.

[73] Assignee: Appleton Electric Co., Chicago, Ill.

[21] Appl. No.: 291,444

[22] Filed: Aug. 10, 1981

[51] Int. Cl.³ .............................................. H02G 3/22
[52] U.S. Cl. ................... 174/65 SS; 285/161; 411/525
[58] Field of Search ............ 174/65 SS, 51, 78, 35 C; 285/158-162; 411/525, 526, 528, 520; 339/95 A, 277 R, 257, 258 A; 24/122.3, 23 R, 295, 129 B, 213 B, 259 R

[56] References Cited

U.S. PATENT DOCUMENTS

| | | | |
|---|---|---|---|
| 2,128,040 | 8/1938 | Conners | 285/162 |
| 2,157,051 | 5/1939 | Birdseye | 339/258 A |
| 2,458,409 | 1/1949 | Paige | 285/162 |
| 2,484,192 | 10/1949 | Squiller | 285/161 X |
| 2,577,748 | 12/1951 | Gillespie | 285/162 |
| 2,639,927 | 5/1953 | Billeter | 285/159 |
| 2,870,239 | 1/1959 | Ustin | 174/87 |
| 2,986,060 | 5/1961 | Lifka | 411/521 |
| 3,084,960 | 4/1963 | Lifka | 285/238 |
| 3,362,366 | 1/1968 | Lifka | 285/161 X |
| 3,436,105 | 4/1969 | Miklya | 285/321 |
| 3,858,151 | 12/1979 | Paskert | 339/14 R |
| 4,012,578 | 3/1977 | Moran et al. | 174/51 |
| 4,022,966 | 5/1977 | Gajajiva | 174/65 SS |
| 4,156,103 | 5/1979 | Dola et al. | 174/65 R |

Primary Examiner—A. T. Grimley
Assistant Examiner—D. A. Tone
Attorney, Agent, or Firm—Jon L. Liljequist

[57] ABSTRACT

A connector for connecting jacketed, metal clad cable to an electrical box includes a tubular metallic body with a stamped and formed retainer element preferably staked therein. This retainer element has an annular rim with radially inwardly directed fingers formed or bent toward the electrical-box end of the connector for permitting insertion of the cable therein preparatory to affixing the two together, for preventing withdrawal of that cable in the opposite direction, and also for providing an electrical grounding continuity. The connector also features an elastomeric compression grommet that compresses into the cable jacket upon the tightening of a nut onto the connector body. A Teflon washer between grommet and nut minimizes the frictional resistance therebetween as the nut is tightened onto the connector body.

4 Claims, 5 Drawing Figures

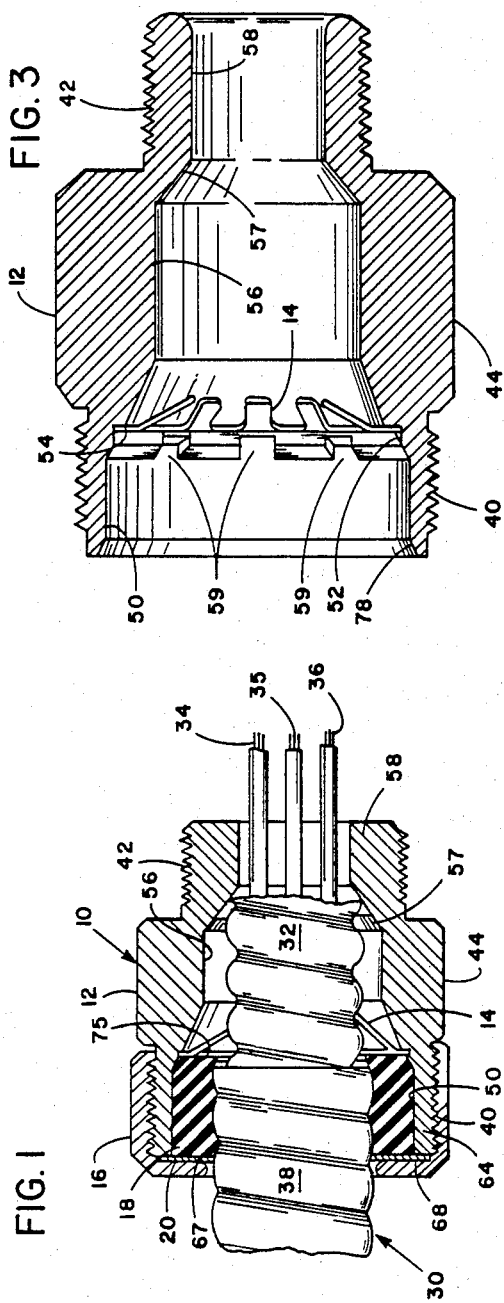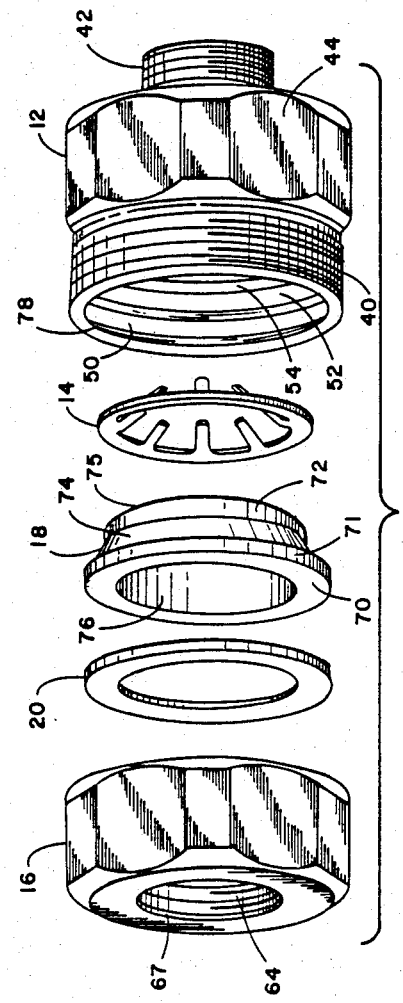

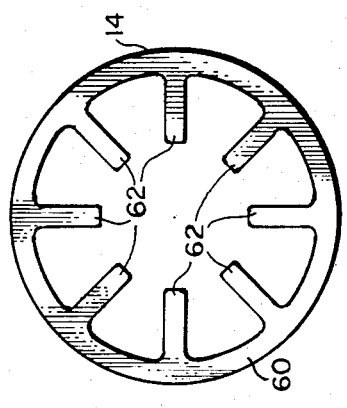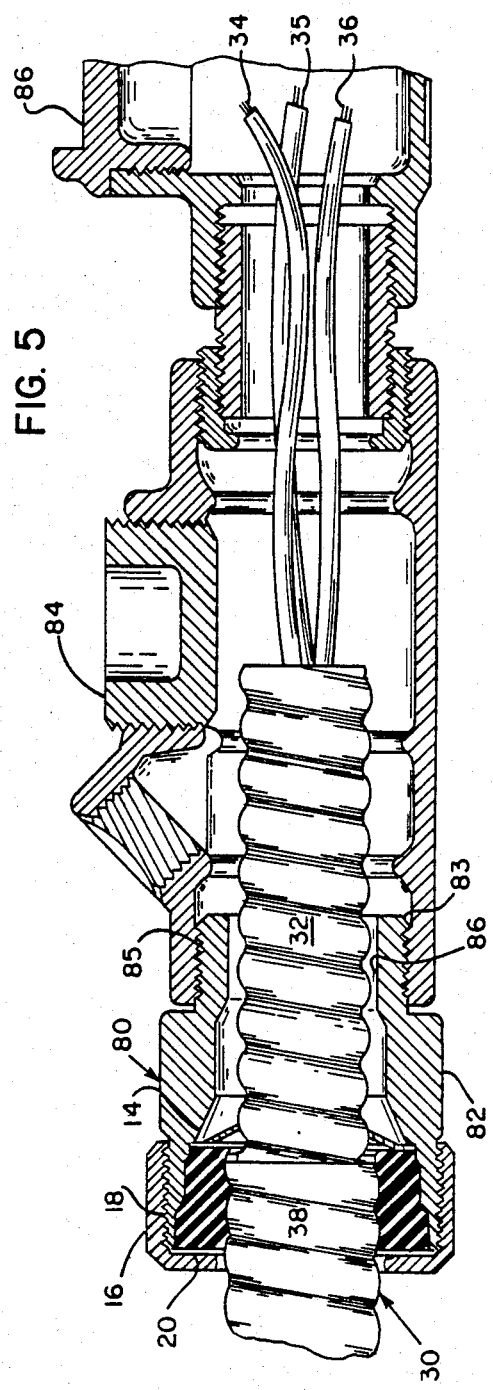

CONNECTOR FOR USE WITH JACKETED METAL CLAD CABLE

BACKGROUND AND SUMMARY OF THE INVENTION

One relatively new type of electrical cable now gaining increasing popularity and acceptance comprises a flexible metallic tube entirely covered with a layer of plastic or other elastomeric material. Some manufacturers of these cables fabricate the tubular metallic core from helical windings making it similar to "BX" cable, while others flute a metallic tube annularly along its length similar to the manner of forming hydroformed bellows. These configurations provide the cable with a degree of flexibility.

At least several connectors ha·· appeared on the market which are designed specifically for connecting this type of cable to an electrical box. Each of these includes at least one compromise somewhere in its design that either unduly increases its cost, limits its use to a narrow range of cable size, or requires an unnecessarily long installation time.

An effective connector for this type of cable should preferably be capable of assembly quickly and easily both to the cable and to an electrical box, accomodate a relatively wide range of cable sizes, provide a solid electrical grounding connection between the metal portions of the cable and the electrical box, and in some applications provide a reasonable seal between the inside of the box and the outside environment.

The connector of this invention (which will be described in greater detail later) includes a tubular connector body and a connector nut, both of which are external and visible parts, and internally it includes a retainer element, a rubber bushing and an anti-friction washer. The retainer element has the shape of a thin, narrow-rim washer with a plurality of integrally formed fingers or prongs extending radially inwardly which are formed or bent somewhat toward the electrical box end of the connector. Each of these fingers terminates short of the center of the washer so that, cumulatively, they form a central opening which is deliberately smaller than the diameter of the metallic portions of the cable. Before the cable is attached to the connector, the outer plastic coating is stripped from its end to expose these metallic portions for direct attachment of the connector thereto. Because different manufacturers produce what is supposed to be standard size cable, but which in fact has metallic portions with significantly different diameters and tolerances, these fingers in the connector assembly must be properly designed to permit a given size cable from any manufacturer to pass through the center hole of the retainer element and deflect the fingers thereon when the cable is moving therethrough in the direction of the electrical box. But, because these fingers are bent toward the electrical box to begin with, any attempt to pull the cable in the opposite direction away from the electrical box causes the fingers to dig or bite into the cable and prevent its removal. Although the retaining element is preferrably staked or swaged in place within the tubular connector body so as to always be fixed and properly oriented for use, it would also work if not affixed to the connector body, although perhaps not with a comparable grounding integrity.

The ease and simplicity of attaching the cable to the connector is further enhanced by appropriately sizing the parts such that the entire connector assembly can be shipped in assembled form with the connector nut drawn up on the connector body by hand. As will be seen, a further tightening of this connector nut (as with a wrench) causes a radial contraction of the rubber grommet to produce an inner diameter which would interfere with the free entry therethrough of the cable. Thus, since the connector nut is not drawn up tightly when shipped, the installer of the connector need only properly prepare the end of the cable (in accordance with directions supplied) and push it through the connector to lock the connector and the cable together. Then, simply by tightening down on the connector nut with an appropriate tool, the connector is further locked onto the cable and an effective sealed connection has also been made.

Because of the importance of creating a good electrical ground between the cable and the electrical box, a proper preparation of the end of the cable requires stripping a designated length of the plastic jacket from the end of the cable. Thus, the retainer element's fingers in fact bite into the metallic portions of the cable so as to electrically connect them. To ensure there exists a ground between the retainer ring and the retainer body, the retainer ring fingers, when angularly deflected by the cable, cause the annular rim portion of the retainer ring to contort and bite into the connector body. Thus, two grounding effects occur simultaneously with the mere pushing of the cable into the connector body. Electrical continuity between the connector body and the electrical box is conventionally achieved by the locknut that holds the connector in place in the electrical box.

One other effect worth mention takes place during final tightening of the connector nut. Because the grommet is compressed into the cable during final tightening, the last few turns of the nut drive the cable further inwardly such that its metallic portions rigidly compress against an internal tapered surface. This both provides additional lateral stability for the connection as well as provides supplemental ground continuity.

Thus, an installer need only strip the end of the cable, push the cable through the connector until it abuts the internal tapered surface, and tighten down the nut to complete both a solid mechanical and reliable electrical ground connection between cable and connector assembly.

DESCRIPTION OF THE DRAWINGS

FIG. 1 is a longitudinal cross-sectional view of a connector assembly embodying the elements of the present invention, this view including a segment of jacketed, metal clad cable secured therein so as to show the relationship between the connector and a cable connected thereby.

FIG. 2 is an exploded perspective view of the connector shown in FIG. 1.

FIG. 3 is a cross-sectional view of the connector body subassembly with the retainer element in place and locked therein.

FIG. 4 is an end view of the retainer element showing the relative size and configuration of the outer annular rim portion and the individual fingers.

FIG. 5 is a cross-sectional view of the connector with a slightly modified body portion for explosion-proof applications.

DESCRIPTION OF PREFERRED EMBODIMENT

Referring now to FIGS. 1 thru 4, and particularly to FIG. 1 initially, there is shown a connector assembly 10 including a connector body 12, a retainer element 14, a connector nut 16, a grommet 18 and a washer 20. Connector assembly 10 is used to connect a length of metal clad cable shown generally at 30 to an electrical box (not shown) in a conventional manner. Cable 30 includes a fluted metallic portion 32 that protectively covers and shields a plurality of conductors 34, 35 and 36. Metallic portions 32 of the cable are coated or covered with a significant layer of plastic or other elastomeric material 38.

Referring now to connector body 12, it is generally tubular in shape with a large external thread 40 at its outermost end, a smaller external thread 42 at its innermost or electrical box end, and a portion 44 therebetween having a generally hexagonally shaped outer configuration which can be grasped by a wrench or equivalent tool. Internally the connector body 12 has four concentric diameters which get progressively smaller from the outer end to the inner, electrical-box end. The largest diameter internal surface 50 is at the outer end inside threads 40, and it steps down to a slightly smaller diameter surface 52 which is quite short axially and which ends at an outwardly facing shoulder 54. From shoulder 54 the inner surface of the connector body slopes to a smaller diameter surface 56 that is preferrably larger then the diameter of the metallic portions 32 of cable 30. Diameter 56 then slopes along surface 57 down to the smallest diameter surface 58 which deliberately has a smaller diameter than the metallic portion 32 of cable 30 so that it cannot pass therethrough. However, this smallest diameter internal surface 58 is sufficiently large to permit all of the cables 34-36 to pass therebetween and into the interior of an electrical box.

Referring now specifically to FIG. 3 there is shown the connector body 12 with retainer element 14 locked in place. Although retainer element 14 could be carried loosely inside surface 52, preferably it is either pressed into that surface by way of an interference fit or, as shown here, it is loosely set against shoulder 54 and staked in place. Thus, as shown in the drawings, the outer diameter of retainer element 14 is slightly smaller than the diameter of surface 52, and a swaging tool (not shown) having portions larger in diameter than the diameter of surface 52 and smaller than the diameter of surface 50 is used to upset portions 59 of surface 52 and drive them against retainer element 14 to lock it against shoulder 54. No more manufacturing operations are needed with this staking operation than would be needed by interferingly pressing the element in place, however overall manufacturing cost is less because tolerances both for internal diameter 52 and for the outside diameter of the retainer element 14 are not as critical as they are with a press fit.

Retainer element 14 is preferrably formed either from spring temper sheet metal or it is later heat treated, and it has a thin outer rim or annulus 60 (see FIG. 4) with a plurality of at least five radially inwardly projecting fingers or prongs 62, here being shown specifically as eight in number. Fingers 62 are each about three times as long as they are wide, and they are bent away from the plane of annulus 60 toward the inner end of the connector at an angle of approximately 35°, although satisfactory results could be achieved with angles up to about 55°. The distal ends of all of the fingers 62 terminate on the circumference of an imaginary circle which is smaller in diameter then the smallest possible diameter of the metallic portions 32 of a given nominal size of cable 30.

Connector nut 16 has a generally hexagonal outer configuration and an internal thread 64 therein. The outermost end 66 of connector nut 16 is turned radially inwardly to form a flange and define both the nuts minimum diameter surface 67 and an inwardly facing shoulder 68.

Grommet 18 is of generally tubular shape and is molded of rubber or some other desirable elastomer. Referring specifically to FIG. 2, it includes an outermost end surface 70, major and minor outer diameters 71 and 72 (respectively) joined by an intermediary tapered surface 74, and also an innermost end surface 75. An axial hole 76 extends therethrough which is of a free or undeformed diameter slightly greater than the outer diameter of the plastic covering 38 of the largest cable 30 intended to be used with the connector. Minor outer diameter 72 fits loosely inside surface 50 of the connector body, and tapered surface 74 abuts a chamfer 78 at the outermost edge of the connector body when originally assembled and prior to the final tightening of the connector nut that clamps the cable in place.

Washer 20 comprises anti-friction means, is preferrably constructed of some low friction material such as Teflon, has an outer diameter slightly larger than the outer diameter of grommet 18, and it's inner diameter is slightly larger than the inner diameter of grommet 18. During assembly of the entire connector assembly, washer 20 is positioned between shoulder 68 on the connector nut and grommet surface 71.

As alluded to earlier, the connector body subassembly is assembled by first dropping retainer element 14 into the outer end of connector body 12 such that it lies against shoulder 54 with its fingers 62 slanting inwardly toward the electrical box end of the connector body. Preferably then a staking tool is driven into the outer end of the connector body 12 to upset some of the material forming inner surface 52 and thereby fix retainer element 14 in that position. Compression grommet 18 and antifriction washer 20 are dropped into connector nut 16, and then connector nut 16 is screwed up on threads 40 by hand until resistance is felt. The connector assembly is then shipped in this condition.

In use, the user has the option of first attaching the connector assembly either to an electrical box or to the cable. In either event, a final assembly involves stripping a designated length of the outer plastic coating 38 from cable 30 so as to expose a proper length of metallic portions 32, pushing this prepared end of cable 30 into the outer end of connector assembly 10 until the exposed edge of metallic portions 32 abuts internal surface 57 inside the connector body, and then tightening nut 16 until all threads are taken up and its leading edge abuts the connector body. As nut 16 rotates, it moves compression grommet 18 toward the inner end of the connector causing it to be compressed radially inwardly so as to squeeze the plastic jacket 38 of the cable to both hold the cable 30 and seal it relative to the connector assembly. During the last few turns of nut 16, after compression grommet 18 is already firmly in contact with jacket 38, cable 30 is even further pushed into the connector toward its electrical box end. Anti-friction washer 20 avoids direct contact between the driving surface 68 of the connector nut and the outer surface 71 of the compression grommet 18. This minimizes resistive torque on the nut and permits the grommet 18 and cable 30 to move axially to the right without twisting.

FIG. 5 shows a connector assembly designated generally 80 having a modified connector body 82 for use in conjunction with explosion-proof applications where explosion-proof seals are required. In the arrangement shown, the inner threaded end 83 of connector assembly 80 is screwed into a standard potting fitting 84. Potting fitting 84 has various side openings for introducing sealing material therein (as is well known in the art), and it is conventionally located between assembly 80 and some form of electrical box 86 or the like. Retainer element 14, connector nut 16, compression grommet 18 and anti-friction washer 20 are identical with the elements shown in FIGS. 1-4 and thus carry the same identification numbers. The principal difference lies in the connector body 82, and it will be noted that the inner end of that body includes a relatively large external thread 85 which permits a large diameter internal hole 86 to extend through that end of the connector, its diameter being larger than that of the metallic portions of cable 30.

It will also be noted that the metallic portions 32 of cable 30 have been stripped of their plastic jacket 38 over a longer span than in the earlier embodiment which permits a longer segment of cable to be pushed through the connector assembly 80. This is desirable so that the stripped end of metallic portions 32 locate inside potting fitting 84 so that they can be properly and thoroughly sealed with potting compound according to well known practice.

Although the foregoing disclosure is detailed to ensure adequacy and aid understanding, this is not intended to prejudice that purpose of a patent which is to cover each new inventive concept therein no matter how others may later disguise it by variations in form or additions or further improvements. The following claims are intended as the chief aid towards this purpose, as it is these that meet the requirements of pointing out the parts, improvements or combinations in which the inventive concepts are found.

We claim:

1. In a connector assembly for connecting metal clad cable to an electrical box, the connector assembly including a generally tubular body defining an outer end, an inner end, a larger and smaller inner diameter, and also including a stamped retaining element having an annular rim portion, the improvement comprising:

said retaining element having an outer diameter stamped to very nearly the same dimension as the larger inner diameter and having a plurality of narrow and relatively widely spaced fingers extending radially inwardly from said annular rim portion and numbering at least five, each finger being several times longer than its width, said fingers being canted away from the outer end of the assembly and cumulatively terminating radially inwardly in interfering relationship relative to the diameter of said metal clad cable whereupon said metal clad cable will significantly deflect said fingers when pushed therethrough inwardly but the radially innermost portions of said fingers dig into the cable so that it cannot be withdrawn thereafter, said tubular body having one internal diameter very nearly the same dimension as the outer diameter of said retaining element, and a shoulder adjacent said diameter for locating said retainer ring at a specific longitudinal position within the tubular body after it is assembled therein.

2. The improved connector assembly as defined in claim 1, wherein portions of said larger inner diameter at a plurality of spaced locations therearound have been upset therefrom and driven against said retaining element to hold same against said shoulder and prevent its removal from the tubular body.

3. The improved connector assembly as defined in claim 1, wherein said connector body has an internal and inwardly sloping surface between said shoulder and said inner end that is adapted to engage and center the end of said metal clad cable to provide additional and longitudinally spaced lateral stability for the cable as well as supplementary grounding therefor.

4. The improved connector assembly as defined in claim 1, wherein said tubular body is metallic and wherein said fingers are adapted to first deflect and then dig into the metal clad portions of the cable to thereby provide an effective electrical connection between the cable and the retaining element, said annular rim portion being sufficiently narrow radially that deflection of said fingers causes the retainer ring to contort and bite into the connector body, thereby completing the electrical grounding of cable to connector body.

* * * * *